No. 861,990. PATENTED JULY 30, 1907.
E. F. KNOWLES.
WATCH CLEANING MACHINE.
APPLICATION FILED JAN. 16, 1906.
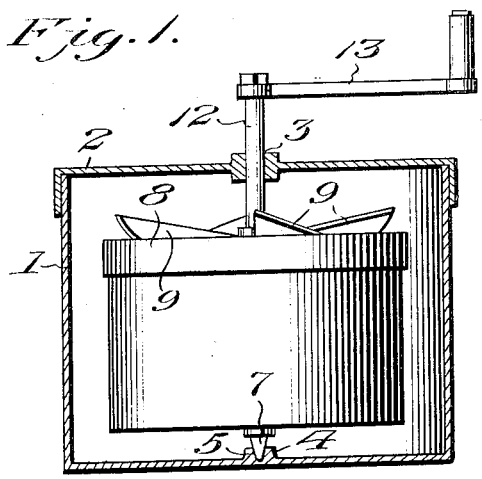
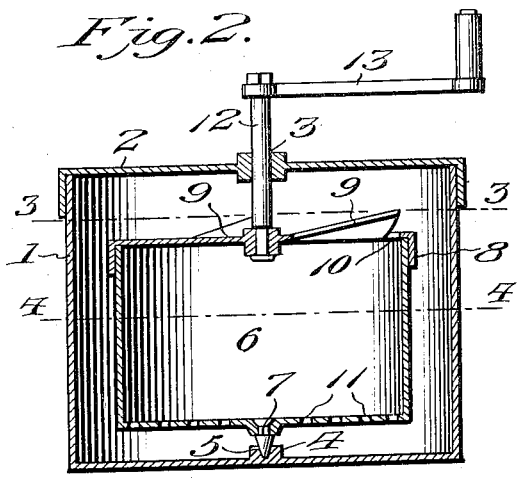
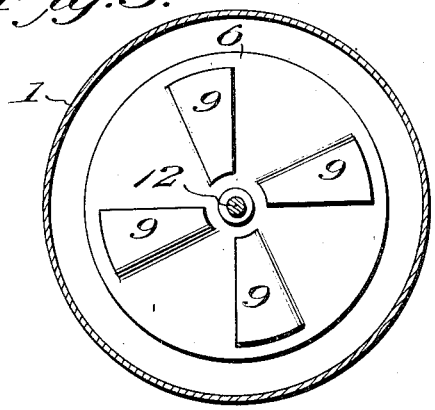
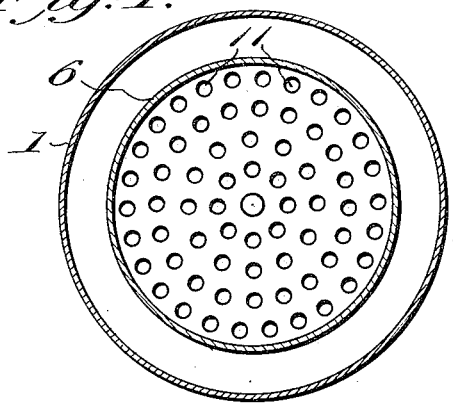
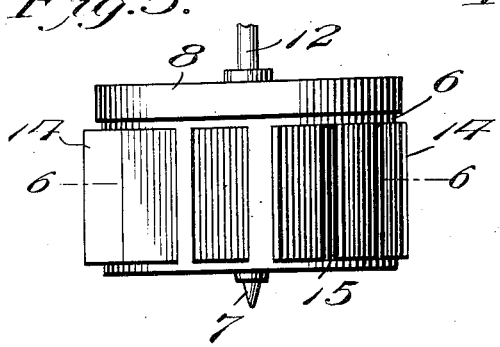
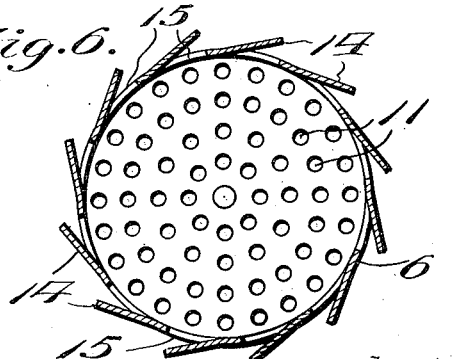
Witnesses
Edwin G. McKee
J. A. Elmor
Inventor
Elmer F. Knowles
By Victor J. Evans
Attorney

UNITED STATES PATENT OFFICE.

ELMER F. KNOWLES, OF BATTLE CREEK, MICHIGAN.

WATCH-CLEANING MACHINE.

No. 861,990.   Specification of Letters Patent.   Patented July 30, 1907.

Application filed January 16, 1906. Serial No. 296,367.

*To all whom it may concern:*

Be it known that I, ELMER F. KNOWLES, a citizen of the United States, residing at Battle Creek, in the county of Calhoun and State of Michigan, have invented new and useful Improvements in Watch-Cleaning Machines, of which the following is a specification.

This invention relates to watch cleaning machines and has for its objects to produce a comparatively simple, inexpensive device of this character which may be readily manufactured and one whereby the works of a watch or clock will be quickly and thoroughly cleaned and this without disconnecting the parts of the works.

A further object of the invention is to provide a device of this type comprising an outer casing and an inner vessel in which a liquid contained in the casing will be positively directed through the vessel during operation of the latter.

With these and other objects in view, the invention comprises the novel features of construction and combination of parts more fully hereinafter described.

In the accompanying drawings: Figure 1 is a side elevation partly in section of a device embodying the invention. Fig. 2 is a vertical transverse section centrally through the machine. Fig. 3 is a horizontal section taken on the line 3—3 of Fig. 2. Fig. 4 is a similar view taken on the line 4—4 of Fig. 2. Fig. 5 is an elevation showing an inner vessel of modified form. Fig. 6 is a section taken on the line 6—6 of Fig. 5.

Referring to the drawings, 1 designates an outer box-like casing provided with a cover 2 having a central bearing opening 3, there being formed on the bottom of the vessel and in line with said opening a bearing lug 4 in which is formed a conical socket 5.

Arranged for rotation within the casing 1 is an inner vessel or container 6 provided on its bottom with a central conical bearing stud 7 designed to seat in the socket 5, said vessel being equipped with a cover 8 having transversely inclined wings or blades 9 struck therefrom and bent upwardly above said openings to provide guides for the fluid from the outer vessel, to produce inlet openings 10, while the bottom of the vessel has numerous perforations 11 formed therein and spaced over its entire surface, these perforations constituting outlet openings.

Fixed on the cover 8 of the vessel and projecting upwardly through the bearing opening 3 is an operating shaft 12 equipped with a crank handle 13 designed for manually operating the shaft to rotate the vessel within the casing 1, as will be readily understood.

In practice, the works to be cleaned are placed in the vessel or container 6 and the casing 1 filled with benzine or analogous liquid, after which the cover 2 is applied and the handle 13 is grasped and manipulated for operating shaft 12 to rotate the vessel 6, during which operation the blades 9 will direct the liquid into the openings 10 and downward through the vessel and the works contained therein whence it will pass outward through the openings 11, it being apparent that owing to the peculiar inclination of the blades 9 the liquid will be driven with sufficient force through the vessel to properly reach all of the parts of the movement under treatment, whereby the same will be effectually cleaned, the impurities being carried off with the liquid through the openings 11.

In Figs. 5 and 6 there is illustrated a slightly modified form of inner vessel 6 and in which the side wall of the vessel has struck therefrom tangentially disposed wings or blades 14 presenting inlet openings 15 through which, during rotation of the vessel, the liquid is forcibly directed by means of the inclined blades in a manner similar to that above described. In other respects the construction and operation of the device is identical with that disclosed above.

Having thus described my invention what I claim as new and desire to secure by Letters Patent of the United States is:—

An apparatus for cleaning time piece movements comprising an outer vessel with a cover therefor, and provided with bearings in its cover and bottom, an inner vessel having a perforated bottom, a cover, transversely arranged blades struck from the cover of the inner vessel to provide radially arranged inlet openings which serve to communicate with the outer vessel, said blades being bent upwardly above said openings in inclined positions to provide guides for the passage of fluid from the outer vessel and through the openings of the cover of the inner vessel, a shaft fixed to the cover of the inner vessel and extending through the bearing in the cover of the outer vessel, substantially as specified.

In testimony whereof, I affix my signature in presence of two witnesses.

ELMER F. KNOWLES.

Witnesses:
HOMER C. VAN AKEN,
FREDRICK W. BARNES.